July 21, 1925.

H. K. DUTCHER

PIPE JOINT

Filed April 14, 1924

INVENTOR
HOWARD KETCHUM DUTCHER
BY
Fetherstonhaugh & Co
ATTORNEYS

Patented July 21, 1925.

1,547,106

UNITED STATES PATENT OFFICE.

HOWARD KETCHUM DUTCHER, OF VANCOUVER, BRITISH COLUMBIA, CANADA.

PIPE JOINT.

Application filed April 14, 1924. Serial No. 706,506.

*To all whom it may concern:*

Be it known that I, HOWARD KETCHUM DUTCHER, a subject of the King of Great Britain, and a resident of the city of Vancouver, in the Province of British Columbia, Canada, have invented certain new and useful Improvements in Pipe Joints, of which the following is a specification.

My invention relates to improvements in pipe joints, the objects of which are first to provide a means whereby pipes may be connected together and the joint rendered watertight without the use of threaded or flanged couplings, also to provide means whereby such joints may be made to pipes which are not in alignment with each other, to provide a means whereby a joint can be tightened up by a single bolt which draws the component parts of the joint together in a true parallel movement, to enable such joints to be made without having access to the underside of the pipe, and to impart a partially rotary compressive movement to the packing strips or gasket of the joint when compressing same.

The invention consists essentially of an inner ring adapted to encircle the end of each pipe to be jointed and to form abutments for a pair of gaskets, and a pair of internally flanged cover rings which are drawn together to compress the gaskets into contact with the pipes, as will be more particularly described in the following specification in which:—

In the drawings like characters of reference indicate corresponding parts in each figure.

Figure 1:
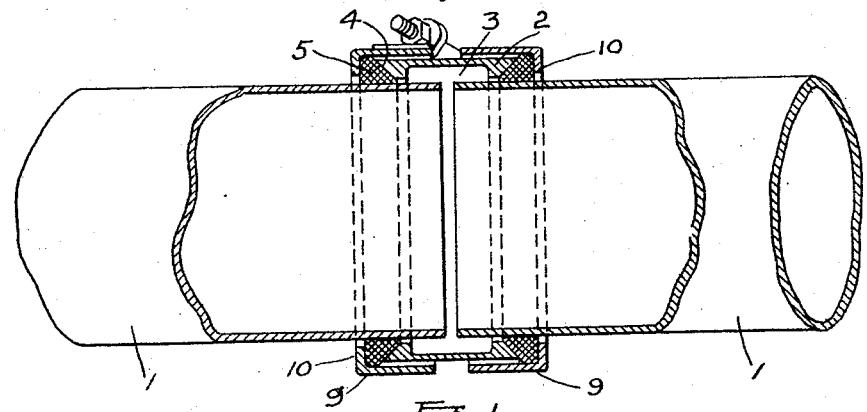
Fig. 1 is a longitudinal sectional view of the pipe joint in position.
Figure 2:
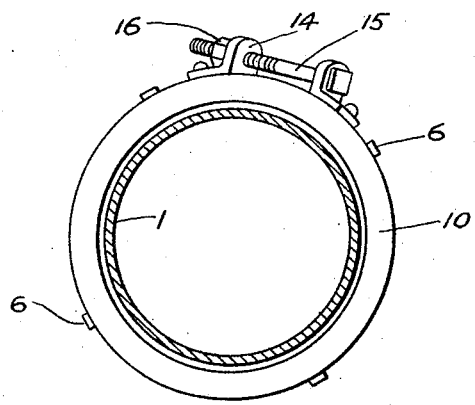
Fig. 2 is a transverse view showing the pipe in section.
Figure 3:
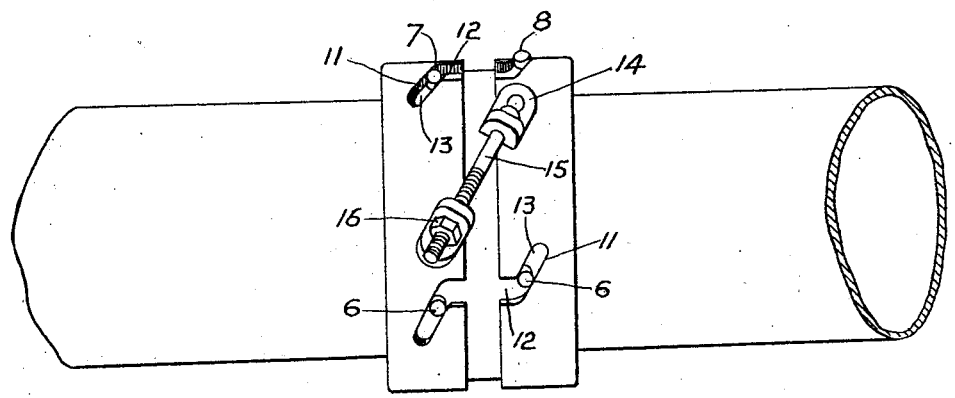
Fig. 3 is a general view showing the joint partially closed about the pipes.

The numeral 1 indicates a pair of pipes which are to be connected end to end. 2 indicates generally an inner ring having a central annular recess 3 within its inner periphery, the end faces of the ring are outwardly splayed as at 4 to provide an abutment for the substantially triangular gaskets 5. A plurality of pins 6 (see Figs. 2 and 3) are disposed to project radially and in two circumferential rows 7 and 8 around the inner ring as a means of engagement with a pair of annular covers generally indicated by the numeral 9. Each of the covers are inturned at their outer ends to form a flange 10 having an inner diameter substantially equal to the outer diameter of the pipes 1 and which forms a seat for the outer edge of the gasket 5. Extending from the inner faces of the cover rings are a plurality of bayonet slots 11 each having a leg 12 which is cut longitudinally of the cover and a tightening leg 13 cut tangentially thereto. Upon each of the cover rings an upstanding bolt lug 14 is riveted at an angle parallel to the legs 13 of the slots 11, and connection between the lugs and the covers is made by a bolt 15 having a nut 16.

Having thus described the several parts of my invention I will now briefly explain its use.

In assembling my pipe joint the parts are first slid onto the end of one pipe, then another pipe is placed in position, bringing the ends of both pipes together, the parts are next separated and the inner ring 2 set to cover the joint of the pipes, the gaskets 5 are brought into contact with the splayed faces or abutments 4 of the inner ring. Following the placing of the gaskets the pair of covers are drawn towards each other and are adjusted circumferentially of the inner ring 2 so that the rows of pins 7 and 8 engage the bayonet slots 11, entering to the extent of the longitudinal leg 12 when the flange 10 of the cover forms a slight seating contact with the outer sides of the gaskets. The bolt 15 is inserted into the lugs 14 and is drawn up with the nut 16, which action causes the tangential leg 13 of the slots 11 to engage the pins to impart a parallel longitudinal movement of the covers upon the inner ring 2 simultaneous with a rotary movement of the covers in opposite directions. The slight rotary movement of the cover flange about the gasket, while the compressing movement is taking place, forces the material of the gasket inwardly along the splayed surface of the abutment of the inner ring and establishes a tight contact with the pipe.

It will be noted that joints can be tightly formed when the axes of the pipes are at an angle to each other since a portion of each pipe end may project into the annular recess 3 of the ring 2.

It will thus be seen that I have invented a pipe joint which is easy to assemble and in which both ends can be simultaneously and equally tightened about the pipe ends by a single fastening bolt.

What I claim as my invention is:

1. A pipe joint comprising in combination with adjoining pipe ends, an annular ring having gasket receiving faces, radially projecting pins carried by said ring, a pair of covers flanged at one end to bear against the gaskets and slotted at the opposite end to engage the pins of the ring, and means for drawing the covers together.

2. A device of the character described comprising a pair of gaskets, an annular member interposed between said gaskets, a pair of end members for compressing the gaskets against opposite sides of the annular member, a connection between the end members operable to rotate said members relative to the annular member, and coacting means carried by said annular and end members for drawing the end members together during rotation thereof.

3. A device of the character described comprising a pair of annular gaskets, an annular ring interposed between said gaskets, a pair of cover members telescoping said ring and having flanges bearing against the outer sides of said gaskets, a tightening bolt connected to the cover members to extend diagonally therebetween and a plurality of pins carried by the annular member and disposed to extend through and cooperate with inclined slots formed in the cover members.

Dated at Vancouver, B. C., this 7th day of April, 1924.

HOWARD KETCHUM DUTCHER.

Witnesses:
J. J. JOHNSTON,
ERNEST E. CARVER.